United States Patent Office 3,551,484
Patented Dec. 29, 1970

3,551,484
3,5-DISUBSTITUTED BENZAMIDES
Sheldon N. Lewis, Willow Grove, Patrick J. McNulty, Wyndmoor, and Kenneth L. Viste, Warminster, Pa., assignors to Rohm and Haas Company, Philadelphia, Pa., a corporation of Delaware
No Drawing. Filed Apr. 1, 1968, Ser. No. 717,904
Int. Cl. C07c *103/30*
U.S. Cl. 260—558        4 Claims

ABSTRACT OF THE DISCLOSURE

Novel compounds which belong to the class of N-(1,1-dimethylpropenyl) - 3,5 - disubstituted benzamides. These compounds are herbicidal.

---

This invention is concerned with new and useful organic chemical compounds and their use as herbicides. The invention also embodies various herbicidal formulations and the employment of these herbicidal compositions in the control of undesirable plant growth.

The novel compounds of this invention are N-(1,1-dimethylpropenyl)-3,5-disubstituted benzamides and may be represented structurally by the following formula:

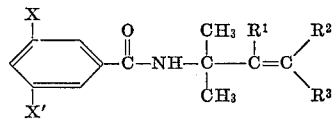

wherein X and X' are individually selected from the group consisting of Br, Cl, F and $CH_3$ and $R^1$, $R^2$ and $R^3$ are individually selected from the group consisting of hydrogen, methyl and chlorine. For convenience in the subsequent discussion, compounds of this invention conforming to the above structure will at times be referred to simply as 3,5-disubstituted benzamides.

Typical compounds within the scope of this invention include:

N-(1,1-dimethylpropenyl)-3,5-dibrombenzamide
N-(1,1-dimethylpropenyl)-3,5-dichlorobenzamide
N-(1,1-dimethylpropenyl)-3,5-difluorobenzamide
N-(1,1-dimethylpropenyl)-3,5-dimethylbenzamide
N-(1,1-dimethylpropenyl)-3-chloro-5-methylbenzamide
N-(1,1-dimethylpropenyl)-3-fluoro-5-methylbenzamide
N-(1,1,2-trimethylpropenyl)-3,5-dichlorobenzamide
N-(1,1,2-trimethylpropenyl)-3-bromo-5-methylbenzamide
N-(1,1,2-trimethylpropenyl)-3,5-dimethylbenzamide
N-(1,1-dimtehyl-2-butenyl)-3,5-dichlorobenzamide
N-(1,1-dimethyl-2-butenyl)-3-chloro-5-fluorobenzamide
N-(1,1-dimethyl-2-butenyl)-3-chloro-5-methylbenzamide
N-(1,1,2-trimethyl-2-butenyl)-3,5-dichlorobenzamide
N-(1,1,3-trimethyl-2-butenyl)-3,5-dichlorobenzamide
N-(1,1,3-trimethyl-2-butenyl)-3-fluoro-5-methyl-
  benzamide
N-(1,1,2,3-tetramethyl-2-butenyl)-3,5-dichlorobenzamide
N-(1,1-dimethyl-2-chloropropenyl)-3,5-dichloro-
  benzamide
N-(1,1-dimethyl-3-chloropropenyl)-3,5-dichloro-
  benzamide
N-(1,1-dimethyl-2,3-dichloropropenyl)-3,5-dichloro-
  benzamide
N-(1,1-dimethyl-2,3,3-trichloropropenyl)-3,5-dichloro-
  benzamide
N-(1,1-dimethyl-2-chloro-2-butenyl)-3,5-dichloro-
  benzamide
N-(1,1-dimethyl-2,3-dichloro-2-butenyl)-3,5-dichloro-
  benzamide
N-(1,1,3-trimethyl-2-chloro-2-butenyl)-3,5-dichloro-
  benzamide
N-(1,1,2-trimethyl-3-chloro-2-butenyl)-3,5-dichloro-
  benzamide.

No compounds exactly comparable to these are known in the literature.

The novel compounds of this invention are prepared by amidation of the appropriately substituted benzoic acid or the substituted benzoic acid derivatives, such as the acid halides, anhydrides, amides, esters or orthoformates. It is preferred to use the acid halides, and of these the acid chloride is preferred.

Certain of the compounds may also be prepared by (1) reduction of the analogous acetylenic compound of the structure

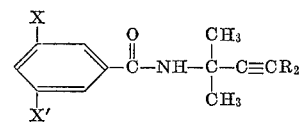

under neutral conditions to compounds of the structure

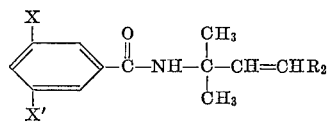

where X, X' and $R_2$ has the meanings given above or (2) by removal of HY from compounds of the structure

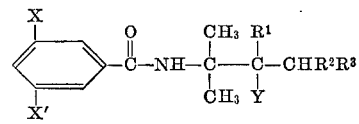

or

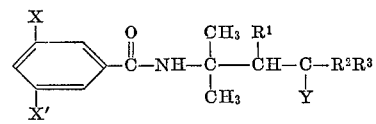

where X, X', $R^1$, $R^2$ and $R^3$ have the meanings given above and Y is a higher halogen.

In preparing the 3,5-disubstituted benzamides of this invention, equal molar ratios of the acid or acid derivative and amine reactants are preferred although a molar excess of amine up to 1:2.5 may be employed. When the acyl halide is used, an acid acceptor such as a tertiary amine, an alkali metal hydroxide or an alkaline earth oxide, hydroxide or carbonate is preferred. Representative acid acceptors are sodium hydroxide, calcium carbonate, pyridine, triethylamine, benzyldimethylamine and magnesium oxide. Although not required, an inert organic solvent of the hydrocarbon, halogenated hydrocarbon, ketone or ether classes of solvents may be used. Suitable solvents are toluene, ethylene dichloride, octane, methyl isobutyl ketone and commercial hydrocarbon mixtures boiling in the range of 90° to 125° C. The amidation reaction may be accomplished in the range of 0° to 50° C. with 10° to 20° C. being preferred. The time of reaction is not critical, but it is usually completed within one to three hours. While the preferred method of amidation is to employ the benzoyl halide, other acid derivatives or the benzoic acid itself give suitable results. If the acid is used, an acid catalyst, such as hydrochloric or sulfuric acid, may be employed to facilitate dehydration of the amine salt to the amide.

Reaction of the acid chloride with an amine may be depicted by the following equation:

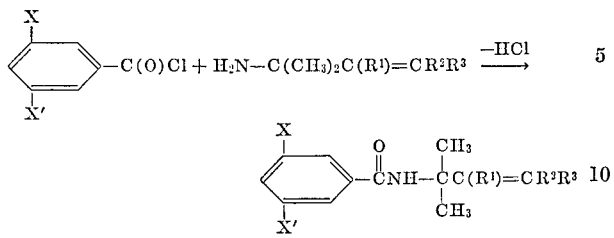

where X, X', $R^1$, $R^2$ and $R^3$ have the meanings given above. These compounds can exist as geometrical isomers. For the most part the amines used in the above reaction are novel.

Details of preparing the active ingredient and typical formulations are given in the following examples which are presented for purposes of illustration and are not intended to limit the scope of the invention.

EXAMPLE 1

N-(1,1-dimethylpropenyl)-3,5-dichlorobenzamide

A mixture of 16 g. (0.168 mole) of 3-amino-3-methyl-1-butene (available by the method of Hennion et al. Journal of Organic Chemistry, 30, 2645 (1966)), 12 g. (0.15 mole) of 50% sodium hydroxide and 63 ml. of octane was stirred with cooling. To this was added dropwise at 15–20° C. 31.3 g. (0.15 mole) of 3,5-dichlorobenzoyl chloride. The mixture was stirred 3 hours and then filtered. The solid residue was recrystallized from methanol and then from n-octane to give 23 g. of white needles melting at 114°–116° C. The solid by analysis was found to contain 55.92% C, 5.23% H, 27.12% Cl, 5.42% N and 6.67% O; calculated for $C_{12}H_{13}Cl_2NO$ is 55.80% C, 5.08% H, 27.48% Cl, 5.44% N and 6.20% O. The product was a 60% yield of N-(1,1-dimethylpropenyl)-3,5-dichlorobenzamide.

EXAMPLE 2

N-(1,1-dimethylpropenyl)-3,5-dimethylbenzamide

When in Example 1 there was substituted an equivalent quantity of 3,5-dimethylbenzoyl chloride for the 3,5-dichlorobenzoyl chloride there was obtained a white solid melting at 90°–91° C. This was found to contain by analysis 77.56% C, 8.98% H, 6.38% N and 7.79% O; calculated for $C_{14}H_{19}NO$ is 77.38% C, 8.81% H, 6.45% N and 7.36% O. The product is N-(1,1-dimethylpropenyl)-3,5-dimethylbenzamide.

EXAMPLE 3

N-(1,1-dimethyl-trans-2-butenyl)-3,5-dimethylbenzamide (a) Preparation of 1,1-dimethyl-2-butynylamine.—To 800 ml. of liquid ammonia was added 12 g. (0.522 atom) of sodium to give a dark-blue solution. To this was added dropwise in 45 min. at reflux temperature a solution of 40 g. (0.482 mole) of 3-amino-3-methylbutyne in 100 ml. of ether. The mixture was stirred one-half hour and then was added 70 g. (0.492 mole) of methyl iodide dropwise in 65 minutes and the mixture stirred one hour longer then allowed to warm to room temperature over night. There was then added 400 ml. of ether and 400 ml. of cracked ice and the mixture was stirred until the ice melted. The aqueous layer was separated and extracted twice with ether and the ether extracts combined with the original ether layer. The ether solution was dried over sodium carbonate and the other removed to give 20 g. of residual oil which was distilled to give a 12 g. fraction distilling at 24°–34° C. at 18 mm. pressure. Gas-liquid chromatography showed only one peak which was not that of the starting amine. Titration with 0.1 N perchloric acid gave a neutral equivalent of 105. The product was 1,1-dimethyl-2-butynylamine of 92.5% purity.

(b) Preparation of 1,1-dimethyl-trans-2-butenylamine.— A flask was charged with 200 ml. of liquid ammonia and 6 g. (0.062 mole) of 1,1-dimethyl-2-butynylamine. To the resulting solution there was alternately added over a period of one hour 2.9 g. (0.124 atom) of sodium and 6.6 g. (0.124 mole) of ammonium chloride. The mixture was stirred one hour then allowed to warm over night at room temperature. There was added 250 ml. of ether with stirring. The ether layer was separated from the insoluble residue and the ether removed to give a residual oil which by titration with 0.1 N perchloric acid gave a neutral equivalent of 132. Examination by infrared and gas-liquid chromatography showed this to be 1,1-dimethyl-trans-2-butenylamine.

(c) Preparation of N-(1,1-dimethyl-trans-2-butenyl)-3,5-dimethylbenzamide.—A mixture of 10 g. (0.087 mole) of 1,1-dimethyl-trans-2-butenylamine hydrochloride and 200 ml. of octane was cooled to 5° C. and there was added 14.4 g. (0.180 mole) of 50% sodium hydroxide. To the stirred mixture there was added dropwise at 3°–5° C. 13.5 g. (0.08 mole) of 3,5-dimethylbenzoyl chloride over a period of one hour. The reaction mixture was allowed to slowly warm to room temperature and then was filtered. The residue was washed with octane then with water, dried and recrystallized from hexane to give 6.3 g. of white crystals melting at 76°–77° C. This was found by analysis to contain 78.07% C, 8.99% H, 6.15% N, 7.25% O; calculated for $C_{15}H_{21}NO$ is 77.88% C, 9.15% H, 6.05% N and 6.91% O. The product is N-(1,1-dimethyl-trans-2-butenyl)-3,5-dimethylbenzamide.

EXAMPLE 4

N-(1,1-dimethyl-trans-2-butenyl-3,5-dichlorobenzamide

When in Example 3(c) an equivalent amount of 3,5-dichlorobenzoyl chloride is substituted for the 3,5-dimethylbenzoyl chloride there resulted a white solid melting at 75°–76.5° C. This was found to contain by analysis 57.10% C, 5.38% H, 25.98% Cl, 5.08% N and 6.21% O; calculated for $C_{13}H_{15}Cl_2NO$ is 57.35% C, 5.55% H, 26.10% Cl, 5.15% N and 5.88% O. Infrared examination confirmed that the product was N-(1,1-dimethyl-trans-2-butenyl)-3,5-dichlorobenzamide.

EXAMPLE 5

N-(1,1-dimethyl-cis-3-chloropropenyl)-3,5-dichlorobenzamide (a) Preparation of 1,1-dimethyl-cis-3-chloropropenylamine hydrochloride.—A mixture of 12 g. (0.1 mole) of 1,1-dimethylpropynylamine hydrochloride and 8.2 ml. (0.1 mole) of concentrated hydrochloric acid was placed in a pressure bottle and heated over night in an oil bath at 125°–145° C. After cooling the content of the bottle was poured into ether, the solid filtered off and recrystallized from a 50:50 mixture of methanol-acetone. The resulting dried solid was 8.1 g. of flaky, white crystals melting at 249°–251° C. Titration with 0.1 N silver nitrate gave an equivalent weight of 161. The solid was found by analysis to contain 38.98% C, 7.26% H, 44.96% Cl and 8.97% N; calculated for $C_5H_{11}Cl_2N$ is 38.80% C, 7.10% H, 45.45% Cl, 8.97% N and a molecular weight of 156. NMR and the analyses showed the product to be 1,1-dimethyl-cis-3-chloropropenylamine hydrochloride.

(b) Preparation of N-(1,1-dimethyl-cis-3-chloropropenyl)-3,5-dichlorobenzamide.—A mixture of 7.8 g. (0.05 mole) of 1,1-dimethyl-cis-3-chloropropenylamine hydrochloride, 16 g. (0.1 mole) of 25% aqueous sodium hydroxide and 200 ml. of hexane was cooled to 15° C. and with stirring there was added 10.5 g. (0.05 mole) of 3,5-dichlorobenzoyl chloride in 15 minutes. The mixture was stirred 3 hrs. at room temperature then filtered and the filter cake washed with water and dried to give 9.3 g. of white powder. This was recrystallized from aqueous methanol then from octane to give 8 g. of white crystals melting at 115°–116° C. This contained by analysis 49.43% C, 3.95% H, 35.94% Cl, 4.68% N and 5.75% O; calculated for $C_{12}H_{12}Cl_3NO$ is 49.25% C, 4.13% H, 36.38% Cl, 4.78% N and 5.46% O. The product is N-(1,1-dimethyl-cis-3-chloropropenyl)-3,5-dichlorobenzamide.

EXAMPLE 6

N-(1,1-dimethyl-trans-3-chloropropenyl)-3,5-dichlorobenzamide (a) Preparation of $ClCH=CH(CH_3)_2CNO_2$.—A mixture of 111 g. (1.0 mole) of the sodium salt of 2-nitropropane, 107 g. (1.1 mole) of 1,1-dichloroethylene and 500 ml. of anhydrous dimethylsulfoxide was heated in a pressure flask equipped with an open manometer at 60° C. for about 65 hours. The cooled reaction mixture was poured into 750 ml. of cold water and then extracted with three 200 ml. portions of ether. The ether extract was washed with water, dried over magnesium sulfate and volatile materials removed by heating on a steam bath to give a 74.6 g. residue. By NMR and gas-liquid chromatography this was shown to be about 80% trans-1-chloro-3-methyl-3-nitro-1-butene with an acetylenic compound as the major impurity. Distillation gave 47.8 g. distilling at 64°–76.5°/5–6 mm. This analyzed 41.36% C, 6.2% H, 23.27% Cl, 9.35% N and 21.27% O; calculated for $C_5H_8ClNO_2$ is 40.2% C, 5.38% H, 23.75% Cl, 9.38% N and 21.4% O.

(b) Preparation of $ClCH=CH(CH_3)_2CNH_2$ and its reaction with 3,5-dichlorobenzoyl chloride.—In a flask was placed 17.5 g. of 40 mesh iron filings, 0.5 g. of anhydrous ferric chloride and 5 ml. of concentrated hydrochloric acid in 37.5 ml. of water and this was allowed to react until hydrogen evolution had stopped. There was then added 12.4 g. (0.083 mole) of trans-1-chloro-3-methyl-3-nitro-1-butene and the mixture was heated 13 hours in an oil bath maintained at 110° C. The reaction mixture was cooled and filtered and the filtrate adjusted to a pH of 8.3 by the addition of 30 ml. of 2 N sodium hydroxide and again filtered. The filtrate was extracted with benzene. The aqueous layer was placed in a flask and cooled in an ice bath and there was added 17.4 g. (0.083 mole) of 3,5-dichlorobenzoyl chloride in 25 ml. of octane, and then 3.3 g. (0.083 mole) of sodium hydroxide pellets was slowly added. After stirring for one hour the reaction mixture was filtered and the residue after drying weighed 13.5 g. Infrared showed that a banzamide, unreacted benzoyl chloride and some 3,5-dichlorobenzoic acid were present. The solid was dissolved in ether and washed with 5% sodium hydroxide and water and 9.5 g. of oily residue isolated from the ether solution. The oil was recrystallized from aqueous methanol to give 3 g. of solid melting at 75°–76° C. This was found by analysis to contain 49.75% C, 4.54% H, 34.50% Cl, 4.65% N and 6.17% O; calculated for $C_{12}H_{12}Cl_3NO$ is 49.25% C, 4.13% H, 36.38% Cl, 4.78% N, and 5.46% O. The product is N-(1,1-dimethyl-trans-3-chloropropenyl)-3,5-dichlorobenzamide.

EXAMPLE 7

Preparation of N-(1,1-dimethyl-2,3-dichloropropenyl)-3,5-dichlorobenzamide (a) Preparation of $CHCl=CH(CH_3)_2CNO_2$.—The oil was washed out of 164 g. (4.0 moles) of a 58.6% slurry of sodium hydride in oil with anhydrous dimethylsulfoxide and anhydrous ether. To the washed slurry was added 2.7 l. of anhydrous dimethylsulfoxide and dropwise 356 g. (4.0 moles) of 2-nitropropane at 25°–30° C. A solid formed and the mixture was warmed to 70° and stirred until the theoretical amount of hydrogen had evolved. There was then added at 70° C. dropwise over a period of 30 minutes 427 g. (4.4 moles) of cis-1,2-dichloroethylene and the mixture heated for about 80 hrs. at 70° C. The reaction mixture was poured into 3 l. of cold water and extracted with benzene. The benzene extract was washed with water and the benzene removed by heating on a steam bath at 50 mm. pressure to give 189 g. of dark oil. The oil was combined with 290 g. of a similar oil made in a similar preparation and distilled. A main fraction distilling at 69°–79° C. at 9.5 mm. pressure was confirmed to be 1-chloro-3-methyl-3-nitro-1-butene.

(b) Preparation of $CHCl_2CHCl(CH_3)_2CNO_2$ and its dehydrohalogenation.—The above 113 g. of 1-chloro-3-methyl-3-nitro-1-butene was dissolved in carbon tetrachloride, irradiated with an ultraviolet lamp placed six inches from the flask, and chlorine bubbled in over a period of two days. The carbon tetrachloride was then removed leaving a residue of 149 g. which upon distillation gave a main fraction of 57.7 g. distilling in the range 55°–60° C. at 0.2–0.3 mm. pressure. Vapor phase chromatography showed this to be at least 90% of 1,2,2-trichloro-3-methyl-3-nitrobutane.

A solution of 33 g. (0.15 mole) of 1,2,2-trichloro-3-methyl-3-nitrobutane in 100 ml. of ether was cooled to 5° C. and there was added a solution of 2,3,4,6,7,8,9,10-octahydropyramido[1,2-a] azepine in 100 ml. of anhydrous ether dropwise with cooling over a period of one and one-half hours. After stirring one-half hour the ether layer was removed by filtration from a gummy residue and was concentrated to give 26.3 g. of dark oil. This was combined with 6.8 g. of a similar oil made in a separate preparation and distilled to give a main fraction distilling at 50°–52° C. at 1.15 mm. pressure. This amounted to 11 g. and by infrared examination was considered to be a mixture of cis and trans isomers of 1,2-dichloro-3-methyl-3-nitro-1-butene.

(c) Reduction of $CHCl=CCl(CH_3)_2CNO_2$ to the amine and its reaction with 3,5-dichlorobenzoyl chloride.— A mixture of 12.7 g. of 40 mesh iron filings, 0.36 g. of ferric chloride, 3.6 ml. of concentrated hydrochloric acid and 27 ml. of water was allowed to react until the evolution of hydrogen has ceased. There was then added 10.4 g. (0.0565) of the dichloro-3-methyl-3-nitro-1-butene prepared in (b) above. The mixture was then stirred 13 hours in an oil bath held at 110° C. The reaction mixture was cooled and filtered. The filtrate was treated with 9 g. of 25% sodium hydroxide to a pH of 8 and filtered. The filtrate was cooled to 15° C. and 2.3 g. of sodium hydroxide pellets was added. To this with stirring was slowly added dropwise a solution of 11.8 g. (0.0565 mole) of 3,5-dichlorobenzoyl chloride in 25 ml. of octane. The mixture was stirred one hour and then filtered. The residue was 6.6 g. of white solid. Infrared showed a benzamide with a benzoic acid impurity. The solid was dissolved in warm aqueous pyridine and 2.7 g. of solid recovered which was recrystallized from methanol. This gave 1 g. of white solid melting at 132.5°–136° C. The solid contained by analysis 44.6% C, 3.55% H, 42.16% Cl, 4.2% N and 5.5% O; calculated for $C_{12}H_{11}Cl_4NO$ is 44.1% C, 3.39% H, 43.4% Cl, 4.28% N and 4.90% O. On the basis of stability, spectrographic and analytical studies the preparation is considered to be N-(1,1-dimethyl-2,3-dichloro-trans-propenyl)-3,5-dichlorobenzamide.

The benzamides of this invention are effective herbicides. They exhibit both preemergence and postemergence activity, but are particularly effective as preemergence herbicides. They are active against both monocotyledonous and dicotyledonous type weeds. Representative compounds of this invention have been found to be particularly effective against such undesirable plants as barnyardgrass (*Echinochloa crusgalli*), dock (Rumex spp.), foxtail (Setaria spp.), Johnsongrass (*Sorghum halepense*), lambsquarters (*Chenopodium album*), pigweed (*Amaranthus* spp.), ryegrass (Lolium spp.) and wild oat (*Avena fatua*). Desirable plants which have been demonstrated to have tolerance to the herbicidal benzamides of this invention include alfalfa (*Medicago sativa*), carrot (*Daucus carota*), corn (*Zea maize*), cotton (*Gossypium hirsutum*), red clover (*Trifolium pratense*), rice (*Oryza sativa*) and soybean (*Glycine max*).

The compositions of the invention comprise one or more of the novel 3,5-disubstituted benzamides together with an agronomically acceptable carrier. By an agronomically acceptable carrier is meant any substance which can be used to dissolve, disperse, or diffuse the chemical within it, without impairing the effectiveness of the toxic agent, which is not permanently deleterious to the soil in any chemical or physical manner and which is usually non-phytocidal to the agricultural crops to be protected. The compositions may be in the form of solutions, emulsifiable concentrates, wettable powders, granules, or dusts. One or more liquid or solid carriers may be used for a particular herbicidal composition.

An emulsifiable concentrate is made by dissolving one or more of the novel 3,5-disubstituted benzamides in a solvent to which one or more surfactants are added. Suitable solvents or liquid carriers for use in preparing these emulsifiable concentrates may, for example, be found in the hydrocarbon and ketone classes of organic solvents such as xylene, acetone, isophorone, mesityl oxide, cyclohexanone and mixtures of these. Preferred solvents are ketone-hydrocarbon mixtures such as isophoronexylene. The emulsifying agents used are surfactants of the anionic, cationic, or non-ionic types and mixtures thereof. Representative of the anionic surfactants are fatty alcohol sodium sulfates, calcium alkylbenzenesulfonates and sodium dialkyl sulfosuccinates. Representative of the cationics are (higher alkyl) dimethylbenzylammonium chlorides. Representative of the non-ionics are condensation products of alkylene oxides with fatty alcohols, alkyl phenols, mercaptans, amines or fatty acids, such as dinonylphenoxypolyethoxyethanol in which there are 8 to 100 ether groupings and similar polyethoxy compounds prepared with other hydrophilic groupings, including esters of long chain fatty acids and mannitan or sorbitan, which are reacted with ethylene oxide.

The following compositions are typical of emulsifiable concentrate formulations when solvents are used.

| | Parts/100 parts total |
|---|---|
| 3,5-disubstituted benzamide | 10–35 |
| Solvent | 55–88 |
| Emulsifying agent | 2–10 |

Wettable powder formulations comprise one or more of the novel 3,5-disubstituted benzamides admixed in a solid carrier along with a surface active agent(s) which gives this type of formulation its wettability, dispersibility and spreading characteristics. Solid carriers which are suitable for preparing these wettable powder formulations are those which have been rendered agronomically suitable by pulverizing devices and may be organic or inorganic in nature. Suitable organic carriers are soybean, walnut or wood flour or tobacco dust; and suitable inorganic ones are clays of the montmorillonite (bentonite), kaolinite or fuller's earth types; silicas such as diatomaceous earth and hydrated silicates; and calcium magnesium carbonates. A surfactant or mixture of surfactants is added to the wettable powder formulation. Suitable dispersing agents are sodium lignin sulfonate, sodium formaldehydenaphthalene sulfonate, or sodium N-methyl-N-higher alkyl taurates. Wetting agents useful for this purpose include higher alkylaryl sulfonates such as calcium dodecylbenzenesulfonate, long-chain alcohol sulfates, sodium alkylphenoxypolyethoxyethyl sulfonates, sodium dioctyl sulfosuccinate, and ethylene oxide adducts with fatty alcohols or with higher alkylphenols, such as octylphenoxypolyethoxyethanol in which there are 8 to 80 ether groupings and similar polyethoxy compounds made from stearyl alcohol. Operative spreading or adhesive agents include glycerol mannitan laurate or a condensate or polyglycerol and oleic acid modified with phthalic anhydride. Additionally, many of the surfactants discussed above function as spreading and adhesive agents. The active ingredient content of the wettable powders may be in the range of about 20 to 80%; however, the preferred range of concentration is 50 to 75%.

The following compositions are typical for wettable powder formulations:

| | Parts/100 parts total |
|---|---|
| 3,5-disubstituted benzamide | 20–80 |
| Carrier | 10–79 |
| Surfactants | 1–10 |

Dust concentrates are made by incorporaitng one or more of the novel 3,5-disubstituted benzamides of this invention into a solid carrier such as finely powdered clays, talc, silica and synthetic silicates, alkaline earth carbonates and diluents or natural origin, such as tobacco dust or walnut shell flour. Granular formulations are made from similar type solid carriers except that the particle size is larger, in the range of 15 to 60 mesh. A small amount of dispersing agent may be incorporated into these solid formulations. The concentration of active ingredients in these dust or granular formulations may be in the range of 2 to 15%.

It will be seen from the above that the compositions of this invention may contain 20% to 98% of additives based on the total weight of the composition, depending on whether it is in the form of a solution, an emulsifiable concentrate, a wettable powder, a dust or a granular formulation.

A particularly convenient method for making solid formulations is to dissolve the active ingredient in a volatile solvent, such as acetone, apply this solution to the solid carrier with thorough mixing, and then remove the solvent by allowing it to evaporate at either normal or reduced pressure.

The compounds were evaluated as herbicides in standard greenhouse tests. Preemergence tests were run by planting representative seeds in flats and spraying an acetone solution of the test compound onto the planted soil at a given dosage. Observations of the percent control of or injury to the plants were made two weeks after treatment. In other preemergence tests the test compound was incorporated into the upper three-fourths inch of soil before planting the seed and observations made two weeks later. In postemergence tests the seeds germinated and the plants were allowed to grow for two weeks before treatment with an acetone solution of the test compound. Observations were then made two weeks later.

The following plants were used in these greenhouse tests and they are given letters as a convenient method of designation.

Monocotyledons:
    A barnyard grass (*Echinochloa crusgalli*)
    B corn (*Zea maize*)
    C foxtail (*Setaria glauca*)
    D Johnsongrass (*Sorghum halepense*)
    E millet (*Setaria italica*)
    F rice (*Oryza sativa*)
    G ryegrass (*Lolium perenne*)
    H Sudangrass (*Sorghum sudanensis*)
    I wheat (*Triticum aestivum*)
    J wild oat (*Avena fatua*)

Dicotyledons:
    K alfalfa (*Medicago sativa*)
    L cotton (*Gossypium hirsutum*)
    M curly dock (*Rumex crispus*)
    N flax (*Linum usitatissimum*)
    O jute (*Corchorus capsularia*)
    P lamb's quarters (*Chenopodium album*)
    Q ladino clover (*Trifolium repens*)
    R peas (*Pisum arvense*)
    S pigweed (*Amaranthus retroflexus*)
    T radish (Raphanus spp.)
    U soybean (*Glycine max*)
    V tomato (*Lypersicum esculentum*)
    W velvetleaf (*Abutilon theophrasti*)
    X wild carrot (*Daucus carota*)

The following tables give typical herbicidal results:

TABLE I
[Preemergence herbicide test at 4 lb./a.]

| Plant species | Percent control with the compound of Example | | | | |
|---|---|---|---|---|---|
| | 1 | 2 | 3 | 4 | 5 |
| Monocotyledons: | | | | | |
| A | 99 | 0 | 0 | 99 | 0 |
| B | 0 | 0 | 0 | 20 | 0 |
| C | 99 | 60 | 80 | 99 | 90 |
| E | 99 | 40 | 70 | 99 | 90 |
| F | 0 | 0 | 0 | 0 | 0 |
| G | 80 | 30 | 40 | 60 | 20 |
| H | 70 | 0 | 0 | 20 | 0 |
| I | 60 | 0 | 10 | 30 | 0 |
| J | 60 | 20 | 30 | 50 | 20 |
| Dicotyledons: | | | | | |
| K | 0 | 90 | 0 | 0 | 0 |
| L | 0 | 0 | 0 | 0 | 0 |
| M | 70 | 60 | 60 | 40 | 40 |
| N | 99 | 99 | 70 | 99 | 30 |
| P | 80 | 80 | 40 | 30 | 50 |
| S | 99 | 99 | 50 | 70 | 50 |
| T | 0 | 0 | 0 | 0 | 0 |
| U | 0 | 0 | 0 | 0 | 0 |
| V | 99 | 90 | 80 | 80 | 0 |
| W | 40 | 30 | 20 | 0 | 0 |
| X | 0 | 0 | 0 | 0 | 0 |

TABLE II
[Preemergence herbicide test with soil incorporation at 4 lb./a.]

| Plant species | Percent control with the compound of Example | | | | | |
|---|---|---|---|---|---|---|
| | 1 | 2 | 3 | 4 | 5 | 6 |
| Monocotyledons: | | | | | | |
| A | 99 | 50 | 50 | 90 | 0 | 30 |
| B | 80 | 10 | 20 | 30 | 0 | 0 |
| C | 90 | 40 | 60 | 30 | 20 | 20 |
| D | 80 | 30 | 20 | 30 | 0 | 0 |
| E | 99 | 30 | 50 | 40 | 20 | 0 |
| F | 0 | 0 | 20 | 0 | 0 | 0 |
| G | 100 | 100 | 100 | 100 | 90 | 100 |
| H | 60 | 0 | 0 | 30 | 30 | 0 |
| I | 60 | 40 | 30 | 60 | 30 | 60 |
| J | 100 | 99 | 99 | 90 | 80 | 20 |
| Dicotyledons: | | | | | | |
| L | 0 | 0 | 0 | 0 | 0 | 0 |
| M | 100 | 100 | 100 | 100 | 100 | 95 |
| N | 100 | 99 | 99 | 99 | 0 | 80 |
| O | 0 | 9 | 0 | 0 | 0 | 80 |
| Q | 70 | 90 | 70 | 0 | 70 | 0 |
| S | 90 | 50 | 50 | 90 | 0 | 0 |
| U | 0 | 0 | 0 | 0 | 0 | 0 |
| W | 0 | 0 | 0 | 0 | 0 | 0 |
| X | 0 | 0 | 0 | 0 | 0 | 0 |

TABLE III
[Postemergence herbicide test at 4 lb./a.]

| Plant species | Percent control with the compound of Example | | | | | | |
|---|---|---|---|---|---|---|---|
| | 1 | 2 | 3 | 4 | 5 | *6 | **7 |
| Monocotyledons: | | | | | | | |
| A | 0 | 10 | 10 | 10 | 9 | 20 | |
| B | 0 | | 10 | | 0 | 50 | |
| C | 0 | 0 | 0 | 0 | 0 | 60 | |
| E | 0 | 0 | 0 | 20 | 20 | 60 | 40 |
| F | 0 | 0 | 0 | 0 | 0 | 20 | |
| G | 0 | 30 | 40 | 10 | 0 | 20 | 40 |
| H | 0 | 0 | 10 | 10 | 20 | 0 | |
| I | 0 | 0 | 0 | 20 | 30 | 50 | |
| J | 0 | 0 | 0 | 10 | 20 | 30 | 20 |
| Dicotyledons: | | | | | | | |
| K | 0 | 30 | 20 | 10 | 60 | 30 | |
| L | | | | 40 | | 30 | |
| M | 60 | 50 | 90 | 90 | 0 | 80 | 0 |
| N | 60 | 70 | 70 | 70 | 100 | 95 | 80 |
| P | 70 | 90 | 95 | 80 | 99 | 80 | |
| S | 60 | 70 | 70 | 60 | 40 | 100 | |
| T | 50 | 40 | 60 | 50 | 80 | 70 | |
| U | 30 | 30 | 60 | 20 | 40 | 30 | |
| V | 60 | 30 | 50 | 60 | 20 | 20 | 90 |
| W | 0 | 20 | 0 | 20 | 0 | 30 | 0 |
| X | 0 | 0, | 0 | 0 | 0 | 20 | |

\* At 6 lb./a.
\*\* At 10 lb./a.

Preemergence field tests were run using a 75% wettable powder formulation of N-(1,1-dimethylpropenyl)-3,5-dichlorobenzamide made by dry blending a mixture of 75 parts by weight of the compound of Example 1, 19 parts of a kaolinite clay sold under the name of Barden clay, 5 parts of sodium lignin sulfonate, and 1 part of octylphenoxypolyethoxyethanol containing about nine ethoxy groups and then micropulverizing twice. In one such test it was found that the following control of wild oat was obtained one month after treatment: 88% at 0.5 lb./a., 95% at 1 lb./a. and 100% at 2 lbs./a. In another such test involving alfalfa and red clover as test crops, it was found that there was no effect on these crops at 1 lb./a. and that there was a 92% control of the natural population of weeds which consisted primarily of barnyard grass, foxtail, lambsquarters, pigweed and ragweed (*Ambrosia artemisiifolia*).

The above data demonstrate that representative compounds of this invention give excellent control of a number of obnoxious weeds and that a number of economically important corp plants are tolerant to them. These are most desirable properties for a practical herbicide.

Generally the active ingredient is applied at the rate of about 0.5 to 10 or more pounds per acre, with 1 to 4 pounds per acre being preferred.

In some instances it may be desirable to add one or more other pesticides. Other herbicides which can be incorporated to provide additional advantages and effectiveness include:

Carboxylic acids and derivatives 2,3,6-trichlorobenzoic acid and its salts
2,3,5,6-tetrachlorobenzoic acid and its salts
2-methoxy-3,5,6-trichlorobenzoic acid and its salts
2-methoxy-3,6-dichlorobenzoic acid and its salts
2-methyl-3,6-dichlorobenzoic acid and its salts
2,4-dichlorophenoxyacetic acid and its salts and esters
2,4,5-trichlorophenoxyacetic acid and its salts and esters
(2-methyl-4-chlorophenoxy)acetic acid and its salts and esters
2-(2,4,5-trichlorophenoxy)propionic acid and its salts and esters
4-(2,4-dichlorophenoxy)butyric acid and its salts and esters
4-(2-methyl-4-chlorophenoxy)butyric acid and its salts and esters
2,3,6-trichlorophenylacetic acid and its salts
3,6-endoxohexahydrophthalic acid
dimethyl 2,3,5,6-tetrachloroterephthalate
trichloroacetic acid and its salts
2,3-dichloroisobutyric acid and its salts
N-(1,1-dimethylpropynyl)-3,5-dichlorobenzamide Carbamic Acid Derivatives ehyl N,N-di(n-propyl)thiolcarbamate
propyl N,N-di(n-propyl)thiolcarbamate
ethyl N-ethyl-N-(n-butyl)thiolcarbamate
propyl N-ethyl-N-(n-butyl)thiolcarbamate
2-chloroallyl N,N-diethyldithiocarbamate
N-methyldithio-carbamic acid salts
ethyl 1-hexamethyleneiminecarbothiolate
isopropyl N-phenylcarbamate
isopropyl N-(m-chlorophenyl)carbamate
4-chloro-2-butynyl N-(m-chlorophenyl)carbamate
methyl N-(3,4-dichlorophenyl)carbamate Phenols dinitro-o-(sec.-butyl)phenol and its salts
pentachlorophenol and its salts Substituted ureas 3-(3,4-dichlorophenyl)-1,1-dimethylurea
3-(4-chlorophenyl)-1,1-dimethylurea
3-phenyl-1,1-dimethylurea
3-(3,4-dichlorophenyl)-3-methoxy-1,1-dimethylurea
3-(4-chlorophenyl)-3-methoxy-1,1-dimethylurea
3-(3,4-dichlorophenyl)-1-n-butyl-1-methylurea
3-(3,4-dichlorophenyl)-1-methoxy-1-methylurea
3-(4-chlorophenyl)-1-methoxy-1-methylurea
3-(3,4-dichlorophenyl)-1,1,3-trimethylurea
3-(3,4-dichlorophenyl)-1,1-diethylurea
dichloral urea

11

Substituted triazines 2-chloro-4,6-bis(ethylamino)-s-triazine
2-chloro-4-ethylamino-6-isopropylamino-s-triazine
2-chloro-4,6-bis(methoxypropylamino)-s-triazine
2-methoxy-4,6-bis(isopropylamino)-s-triazine
2-chloro-4-ethylamino-6-(3-methoxypropylamino)-s-triazine
2-methylmercapto-4,6-bis(isopropylamino)-s-triazine
2-methylmercapto-4,6-bis(ethylamino)-s-triazine
2-methylmercapto-4-ethylamino-6-isopropylamino-s-triazine
2-chloro-4,6-bis(isopropylamino)-s-triazine
2-methoxy-4,6-bis(ethylamino)-s-triazine
2-methoxy-4-ethylamino-6-isopropylamino-s-triazine
2-methylmercapto-4-(2-methoxyethylamino-6-isopropylamino-s-triazine

Diphenyl ether derivatives 2,4-dichloro-4'-nitrodiphenyl ester
2,4,6-trichloro-4'-nitrodiphenyl ether
2,4-dichloro-6-fluoro-4'-nitrodiphenyl ether
3-methyl-4'-nitrodiphenyl ether
3,5-dimethyl-4'-nitrodiphenyl ether
2,4'-dinitro-4-trifluoromethyldiphenyl ether

Anilides

N-(3,4-dichlorophenyl)propionamide
N-(3,4-dichlorophenyl)methacrylamide
N-(3-chloro-4-methylphenyl)-2-methylpentanamide
N-(3,4-dichlorophenyl)trimethylacetamide
N-(3,4-dichlorophenyl)-α,α-dimethylvaleramide

Uracils 5-bromo-3-s-butyl-6-methyluracil
5-bromo-3-cyclohexyl-1,6-dimethyluracil
3-cyclohexyl-5,6-trimethyleneuracil
5-bromo-3-isopropyl-6-methyluracil
3-tert-butyl-5-chloro-6-methyluracil

Nitriles 2,6-dichlorobenzonitrile
diphenylacetonitrile
3,5-dibromo-4-hydroxybenzonitrile
3,5-diiodo-4-hydroxybenzonitrile

Other Organic Herbicides 2-chloro-N,N-diallylacetamide
maleic hydrazide
3-amino-1,2,4-triazole

12 monosodium methanearsonate
disodium methanearsonate
N,N-dimethyl-α,α-diphenylacetamide
N,N-di-(n-propyl)-2,6-dinitro-4-trifluoromethylaniline
N,N-di-(n-propyl)-2,6-dinitro-4-methylaniline
N,N-di(n-propyl)-2,6-dinitro-4-methylsulfonylaniline
O-(2,4-dichlorophenyl)-O-methyl-isopropylphosphoramidothioate
4-amino-3,5,6-trichloropicolinic acid
2,3-dichloro-1,4-naphthaquinone
di(methoxythiocarbonyl)disulfide
6,7-dihydrodipyrido[1,2-a:2',1'-c]pyrazidinium salts
1,1'-dimethyl-4,4'-bipyridinium salts
3,4,5,6-tetrahydro-3,5-dimethyl-2-thio-2H-1,3,5-thiadiazine.

This invention provides new compounds which are useful for inhibiting or controlling undesirable plant growth in numerous environments.

We claim:

1. A compound of the formula:

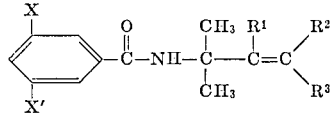

wherein X and X' are individually selected from the group consisting of Br, Cl, F and $CH_3$ and $R^1$, $R^2$ and $R^3$ are individually selected from the group consisting of hydrogen, methyl and chlorine.

2. The compound of claim 1 wherein X and X' are Cl and $R^1$, $R^2$ and $R^3$ are hydrogen.

3. The compound of claim 1 wherein X and X' are methyl and $R^1$, $R^2$ and $R^3$ are hydrogen.

4. The compound of claim 1 wherein X and X' are Cl and $R^1$ and $R^3$ are hydrogen and $R^2$ is methyl.

References Cited

UNITED STATES PATENTS 3,231,360  11/1966  Newallis et al. _____ 260—558

HENRY R. JILES, Primary Examiner

H. I. MOATZ, Assistant Examiner

U.S. Cl. X.R.

71—87, 92, 93, 94, 98, 100, 103, 105, 108, 109, 110, 112, 113, 115, 116, 117, 118